F. B. MORTON.
SOIL PIPE FITTING.
APPLICATION FILED APR. 3, 1909.
942,339.
Patented Dec. 7, 1909.
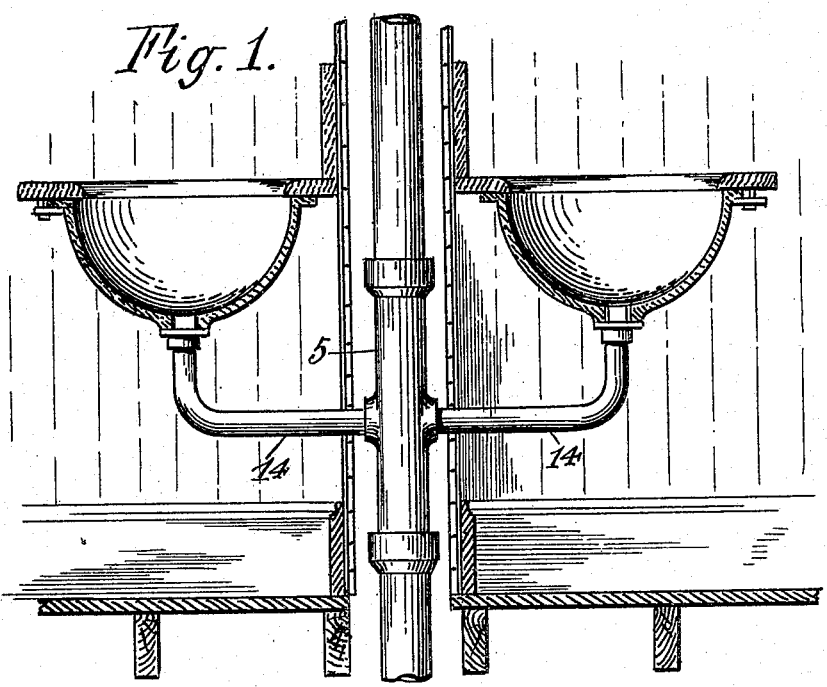
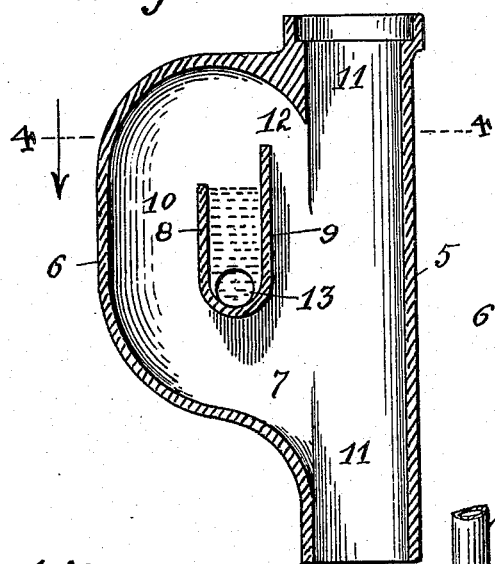
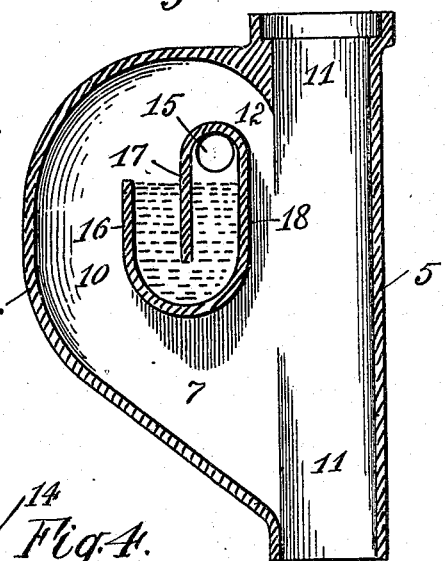
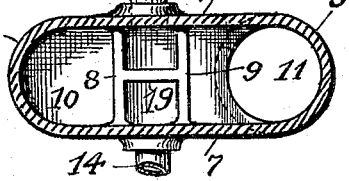
Witnesses,
Inventor,
Fred B. Morton,

UNITED STATES PATENT OFFICE.

FRED B. MORTON, OF PASADENA, CALIFORNIA.

SOIL-PIPE FITTING.

942,339.

Specification of Letters Patent.

Patented Dec. 7, 1909.

Application filed April 3, 1909. Serial No. 487,777.

*To all whom it may concern:*

Be it known that I, FRED B. MORTON, a citizen of the United States, residing at the city of Pasadena, county of Los Angeles, and State of California, have invented new and useful Improvements in Soil-Pipe Fittings, of which the following is a specification.

One object of my invention is to provide a non-siphoning trap which is formed integral with the drainage pipe and is so situated that the drainage from the floors above cannot enter the trap.

Another object of my invention is to provide a trap which may be used for two fixtures situate on opposite sides of a partition, which trap will be inclosed in the partition and out of sight.

Another object is to dispense with the usual vent pipe in a two or more story building, by constructing a trap which will be formed integral with a section of soil pipe, and which will discharge into a channel on the side of the trap, which discharge channel will pass downwardly below the trap and then unite with the main channel of the soil pipe, and which will have a channel above the trap opening into the main channel of the soil pipe, such top opening being so formed that the discharge from the floors above cannot enter the trap.

I accomplish these objects by the fitting described herein and illustrated in the accompanying drawings, in which:

Figure 1 shows a section of soil pipe provided with my improved fitting and showing two washbowls attached thereto on opposite sides of the partition, said section being connected into a stack, a portion of which is shown. Fig. 2 is a longitudinal central section of the section of soil pipe shown in Fig. 1 taken on a plane at right angles to that of Fig. 1. Fig. 3 shows a modification of my improved trap. Fig. 4 is a section on the line 4—4 of Fig. 2.

In the drawings 5 is a section of soil pipe which has an enlargement 6 on one side thereof which forms what I term a trap chamber. The side walls 7 of this trap chamber are preferably the same distance apart as the diameter of the soil pipe. Near the center of this chamber is the trap whose walls 8 and 9 are united to the side walls and are connected at the bottom. The wall 9 is preferably a little higher than the wall 8, and the trap is offset from the channel of the soil pipe and is preferably set into the trap chamber at a distance approximately one fourth the distance of the diameter of the soil pipe from the vertical plane passing along the channel of the soil pipe nearest the trap. On the outside of the trap is a channel 10 which passes downwardly below the trap and units with channel 11 of the soil pipe. Above the trap is a channel 12 which opens downwardly into channel 11. Where there are fixtures to be connected to the trap on opposite sides of the partition as shown in Fig. 1, there would be a fixture opening 13 on each side of the trap at the bottom thereof. To these openings the fixture pipe 14 would be connected in any appropriate manner, and a partition 19 could be placed therebetween or the partition could be omitted.

In the modified form shown in Fig. 3 the fixture opening 15 is above the plane of the top of the wall 16 of the trap. In this construction I provide a partition wall 17 which extends downwardly between the walls 16 and 18 of the trap and then passes upwardly and above the fixture opening 15 and joins the inner wall 18 of the trap and then passes upwardly and above the fixture opening 15 and joins the inner wall 18 of the trap. In this construction the water seal is contained wholly within the trap. In my preferred construction, however, the water seal would be to the same level in the vertical portion of the fixture pipe as in the trap, the trap itself and the horizontal portion of the fixture pipe. By this construction a large trap is provided which is discharged and replenished every time either fixture is used. This construction also provides an active water seal for both fixtures, even though one of the fixtures should not be used.

Having described my invention what I claim is:

1. As a new article of manufacture, a soil pipe fitting comprising a tubular body with an enlargement on one side thereof and a trap in said enlargement all comprising one integral structure adapted to be inserted into and form a part of a line of soil pipe, said trap being offset from the main channel of said soil pipe and having a channel or open way at the sides and at the top and bottom of the trap.

2. A soil pipe fitting comprising a tubular body with an enlargement on one side thereof; a trap in said enlargement offset from the main channel of the tubular body, said fitting having a channel between the trap and the outer wall thereof passing downwardly and below the trap and opening into the main channel of the tubular body, said trap being provided with apertures with which the fixture pipes can be connected.

3. A soil pipe fitting comprising a section of soil pipe having a trap chamber on one side thereof said chamber opening into the channel passing through said soil pipe; a trap in said trap chamber having the wall near the section of the soil pipe higher than the other wall and being situate near the center of said chamber whereby the discharge from the trap passes down at the side of and below the trap and into the body of the soil pipe member, said trap having an opening into the bottom thereof with which a fixture pipe can be connected.

4. A soil pipe fitting comprising a tubular body having on one side thereof an enlargement, said enlargement forming a trap chamber; a trap in said chamber offset from the channel of the tubular body, said trap having a channel extending all around the same and having the wall nearer the channel through the tubular body higher than the other wall, and being provided with apertures opening into said trap with which the fixture pipes can be connected.

5. A soil pipe fitting comprising a section of soil pipe having a trap chamber on one side thereof opening into the channel passing through the soil pipe; and a trap in said chamber offset from the channel of the soil pipe.

In witness that I claim the foregoing I have hereunto subscribed my name this 29th day of March, 1909.

FRED B. MORTON.

Witnesses:
 G. E. HARPHAM,
 S. B. AUSTIN.